(12) United States Patent
Stiles

(10) Patent No.: US 8,028,874 B2
(45) Date of Patent: Oct. 4, 2011

(54) KAYAK HANDLING SYSTEM

(76) Inventor: Christopher S. Stiles, Petersburg, FL (US)

( * ) Notice: Subject to any disclaimer, the term of this patent is extended or adjusted under 35 U.S.C. 154(b) by 226 days.

(21) Appl. No.: 12/455,966

(22) Filed: Jun. 10, 2009

(65) Prior Publication Data
US 2010/0316474 A1 Dec. 16, 2010

(51) Int. Cl.
*B60R 9/00* (2006.01)
*B60P 3/10* (2006.01)
*B65G 13/00* (2006.01)

(52) U.S. Cl. ........ 224/310; 224/405; 224/488; 224/519; 193/42; 193/37; 414/462

(58) Field of Classification Search ............... 193/37, 193/42; 224/310, 405, 506, 521; 280/414.1; 414/462, 559
See application file for complete search history.

(56) References Cited

U.S. PATENT DOCUMENTS

| | | | | |
|---|---|---|---|---|
| 2,052,900 A | * | 9/1936 | Searles et al. | 198/843 |
| 2,325,762 A | * | 8/1943 | Ford | 193/42 |
| 2,517,112 A | * | 8/1950 | Jones | 193/42 |
| 3,092,233 A | * | 6/1963 | Titchenal | 193/35 F |
| 3,170,583 A | * | 2/1965 | Meyer | 414/462 |
| 3,387,727 A | * | 6/1968 | Micheel | 414/462 |
| 3,976,213 A | * | 8/1976 | Ball | 414/462 |
| 4,193,729 A | * | 3/1980 | Winfield | 414/532 |
| 4,470,745 A | | 9/1984 | Shotwell | |
| 4,630,990 A | | 12/1986 | Whiting | |
| 5,595,283 A | * | 1/1997 | Whetsel | 198/812 |
| 5,850,959 A | * | 12/1998 | Miller | 224/535 |
| 6,050,627 A | * | 4/2000 | Lee | 296/26.09 |
| 6,705,822 B2 | * | 3/2004 | Oldak | 414/532 |
| 2006/0120845 A1 | | 6/2006 | Moore | |
| 2010/0316474 A1 | * | 12/2010 | Stiles | 414/462 |
| 2011/0024472 A1 | * | 2/2011 | Thompson et al. | 224/500 |

* cited by examiner

*Primary Examiner* — Gregory Adams

(57) ABSTRACT

An L-shaped member has a forwardly extending horizontal leg and an upwardly extending vertical leg. The horizontal leg has a forward end removably couplable with respect to a hitch of a vehicle. The vertical leg has an upper end. A roller assembly includes a U-shaped support. The U-shaped support has a horizontal central portion coupled to the upper end of the vertical leg. The U-shaped support has upwardly extending vertical end legs and a shaft rotatably supported by the end legs. The roller assembly includes primary rollers rotatably supported on the shaft. A spacer is provided between the primary rollers. A bottom of an object is positionable upon the primary rollers and pushed into position upon a roof of the vehicle.

2 Claims, 3 Drawing Sheets

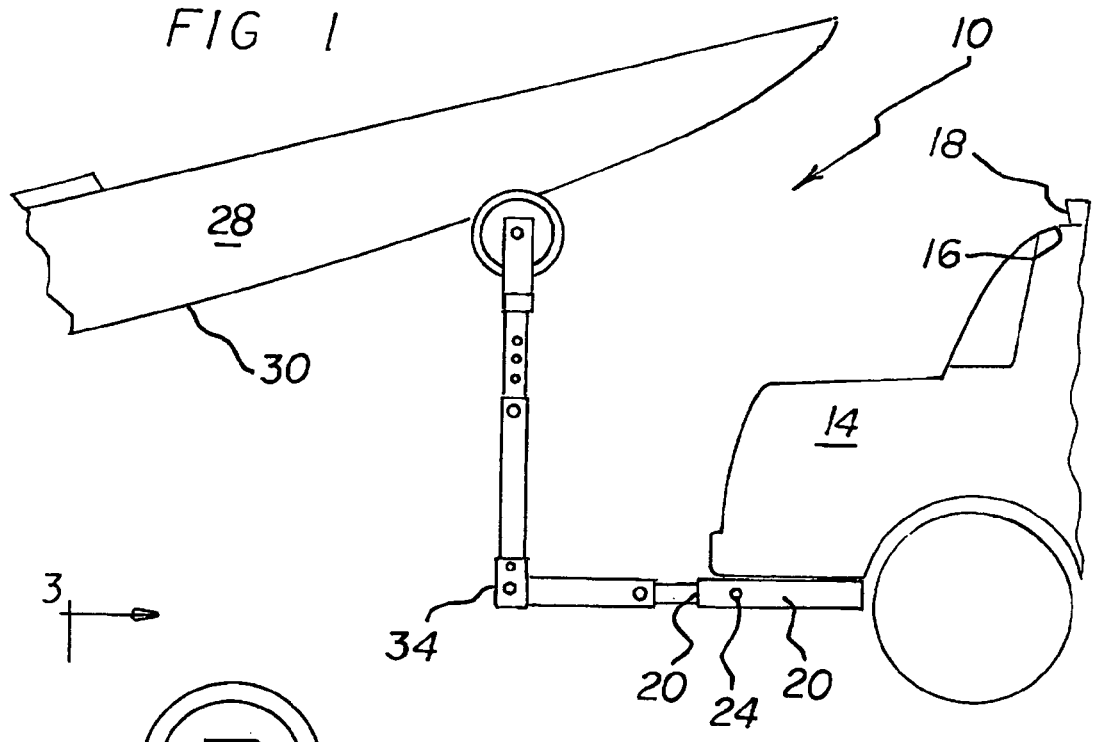
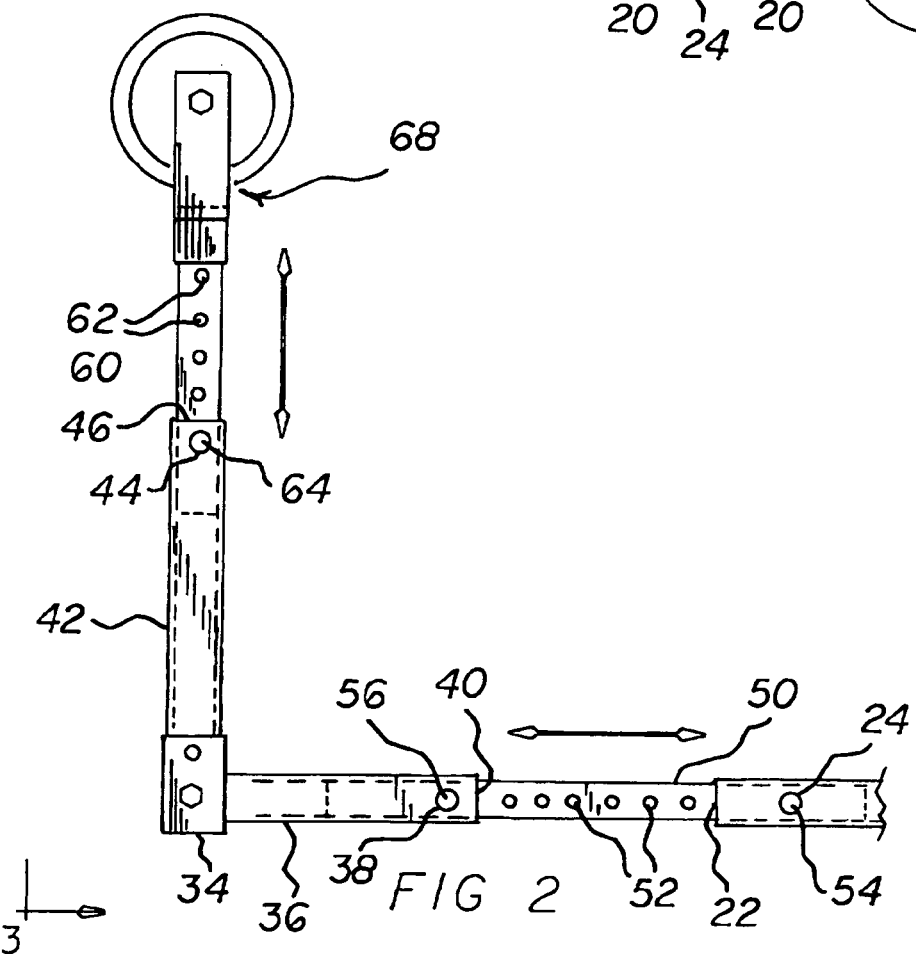

KAYAK HANDLING SYSTEM

BACKGROUND OF THE INVENTION

1. Field of the Invention

The present invention relates to a kayak handling system and more particularly pertains to assisting a user in lifting a kayak or other object onto a roof of a vehicle and in removing the boat there from in a safe, rapid and economical manner.

2. Description of the Prior Art

The use of handling systems of known designs and configurations is known in the prior art. More specifically, handling systems of known designs and configurations previously devised and utilized for the purpose of handling kayaks or other objects through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,470,745 issued Sep. 11, 1984 to Shotwell relates to a Boat Loader and Unloader. U.S. Pat. No. 4,630,990 issued Dec. 23, 1986 to Whiting relates to a Device and Method for Loading and Transporting Elongated Objects on the Tops of Vehicles. Lastly, U.S. Patent Application Publication Number 2006/0120845 published Jan. 8, 2006 to Moore relates to a Canoe Loader.

While these devices fulfill their respective, particular objectives and requirements, the aforementioned patents do not describe a kayak handling system that allows for assisting a user in lifting a kayak or other object onto a roof of a vehicle and in removing the boat there from in a safe, rapid and economical manner.

In this respect, the kayak handling system according to the present invention substantially departs from the conventional concepts and designs of the prior art, and in doing so provides an apparatus primarily developed for the purpose of assisting a user in lifting a kayak or other object onto a roof of a vehicle and in removing the boat there from in a safe, rapid and economical manner.

Therefore, it can be appreciated that there exists a continuing need for a new and improved kayak handling system which can be used for assisting a user in lifting a kayak or other object onto a roof of a vehicle and in removing the boat there from in a safe, rapid and economical manner. In this regard, the present invention substantially fulfills this need.

SUMMARY OF THE INVENTION

In view of the foregoing disadvantages inherent in the known types of handling systems of known designs and configurations now present in the prior art, the present invention provides an improved kayak handling system. As such, the general purpose of the present invention, which will be described subsequently in greater detail, is to provide a new and improved kayak or other object handling system and method which has all the advantages of the prior art and none of the disadvantages.

To attain this, the present invention essentially comprises a kayak handling system. First provided is a vehicle. The vehicle has a roof. Provided on the roof is a roof mounted supporting device. The vehicle also has a horizontally extending hitch. The hitch has a rearwardly facing recess. Apertures are provided in the recess.

A kayak is provided. The kayak has a keel. The keel is removably positionable upon the roof mounted supporting device.

Provided next is an L-shaped member. The L-shaped member has a forwardly extending horizontal leg. Apertures are provided through the horizontal leg. The horizontal leg terminates in a recess. The L-shaped member also has an upwardly extending vertical leg. Apertures are provided in the vertical leg. The vertical leg terminates in a recess.

A horizontal extension piece is provided next. A plurality of apertures are provided along the length of the horizontal extension piece. The horizontal extension piece has a front end. The front end is positioned within the rearwardly facing recess of the hitch. A forward pin is provided. The forward pin removably extends through the apertures of the hitch. The forward pin extends through the apertures in the horizontal extension piece for coupling purposes. The horizontal extension piece has a rear end. The rear end is positioned within the recess of the horizontal leg. A rearward pin is provided. The rearward pin removably extends through the apertures in the horizontal leg and the apertures in the horizontal extension piece for coupling purposes.

Further provided is a vertical extension piece. A plurality of apertures is provided along the length of the vertical extension piece. The vertical extension piece has an upper end. The vertical extension piece has a lower end. The lower end is positioned within the recess of the vertical leg. An upper pin is provided. The upper pin removably extends through apertures of the vertical leg and the apertures in the vertical extension piece for coupling purposes.

Provided last is a roller assembly. The roller assembly includes a cross piece. The cross piece has a central extent attached to the upper end of the vertical extension piece. The roller assembly includes a U-shaped support. The U-shaped support has a horizontal central portion. The horizontal central portion is bolted to the cross piece. The U-shaped support has upwardly extending end legs. The U-shaped support has a shaft. The shaft is rotatably supported by the end legs. The shaft has an axis. The axis of the shaft is in a horizontal plane closer to the roof of the vehicle than to the hitch. The roller assembly includes primary rollers. The primary rollers are rotatably supported on the shaft. A central spool-shaped spacer is provided. Washers are provided. The central spool-shaped spacer and washers are provided between the primary rollers. The roller assembly includes secondary rollers. The secondary rollers are rotatably supported on the shaft adjacent to the end legs. A cylindrical spacer is provided. The cylindrical spacer is provided between each secondary spacer and an adjacent end leg. In this manner the keel of the kayak is adapted to be positioned upon the primary rollers and pushed into position upon the roof of the vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved kayak handling system which has all of the advantages of the prior art handling systems of known designs and configurations and none of the disadvantages.

It is another object of the present invention to provide a new and improved kayak handling system which may be easily and efficiently manufactured and marketed.

It is further object of the present invention to provide a new and improved kayak handling system which is of durable and reliable constructions.

An even further object of the present invention is to provide a new and improved kayak handling system which is susceptible of a low cost of manufacture with regard to both materials and labor, and which accordingly is then susceptible of low prices of sale to the consuming public, thereby making such kayak handling system economically available to the buying public.

Even still another object of the present invention is to provide a kayak handling system for assisting a user in lifting a kayak or other object onto a roof of a vehicle and in removing the boat there from in a safe, rapid and economical manner.

Lastly, it is an object of the present invention to provide a new and improved kayak handling system. An L-shaped member has a forwardly extending horizontal leg and an upwardly extending vertical leg. The horizontal leg has a forward end removably couplable with respect to a hitch of a vehicle. The vertical leg has an upper end. A roller assembly includes a U-shaped support. The U-shaped support has a horizontal central portion coupled to the upper end of the vertical leg. The U-shaped support has upwardly extending vertical end legs and a shaft rotatably supported by the end legs. The roller assembly includes primary rollers rotatably supported on the shaft. A spacer is provided between the primary rollers. A bottom of an object is positionable upon the primary rollers and pushed into position upon a roof of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a boat handling system constructed in accordance with the principles of the present invention.

FIG. 2 is an enlarged illustration of the central components shown in FIG. 1.

The same reference numerals refer to the same parts throughout the various Figures.

DESCRIPTION OF THE PREFERRED EMBODIMENT

Figure 3:
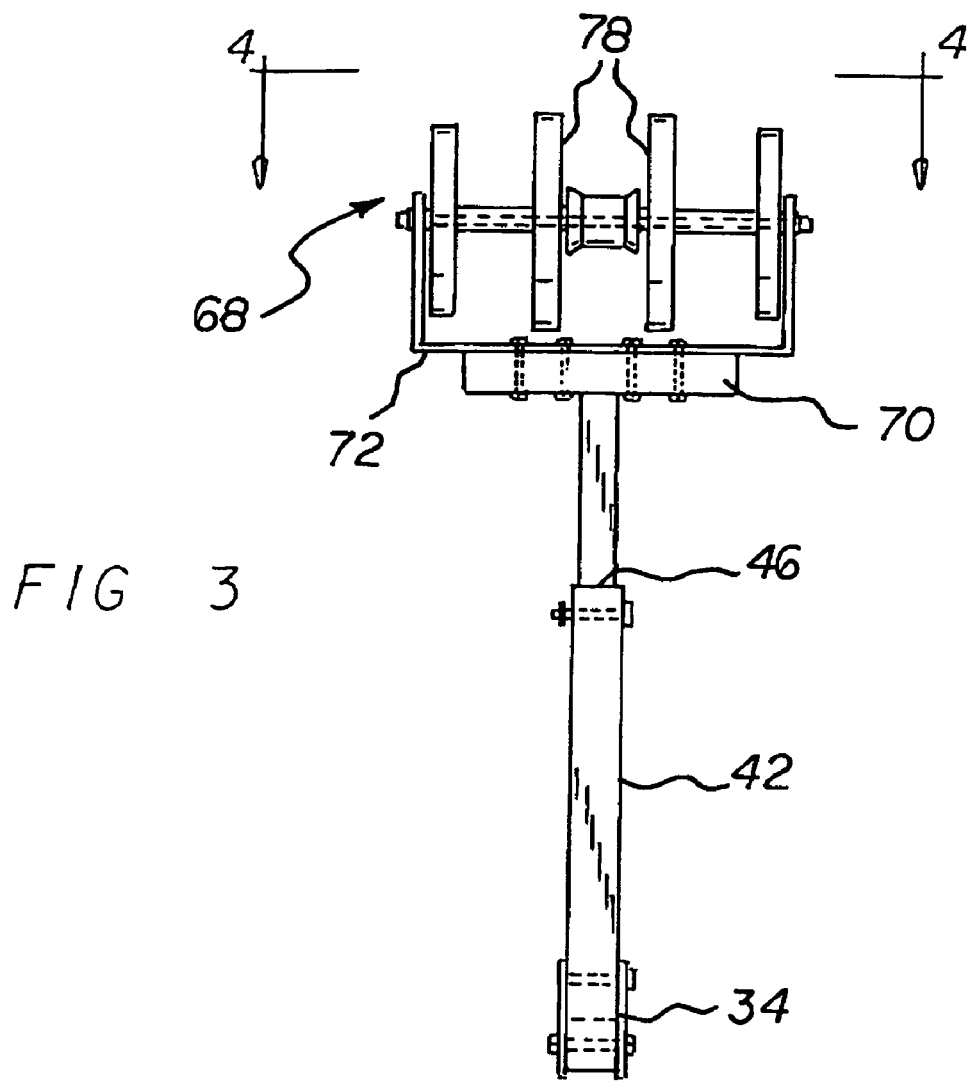
FIG. 3 is a rear elevational view of a portion of the system taken along line 3-3 of FIG. 2.
Figure 4:
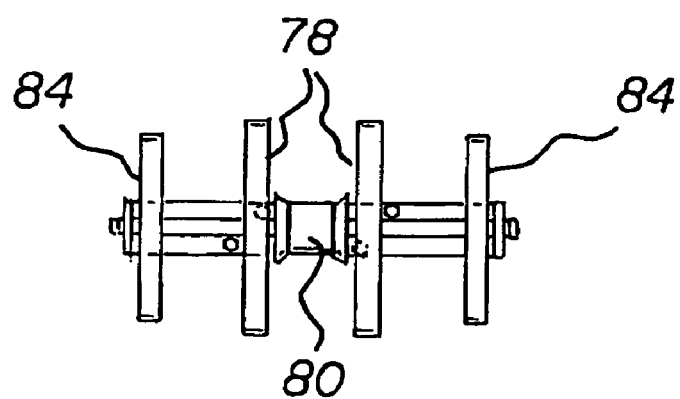
FIG. 4 is a plan view of a portion of the system taken along line 4-4 of FIG. 3.
Figure 5:
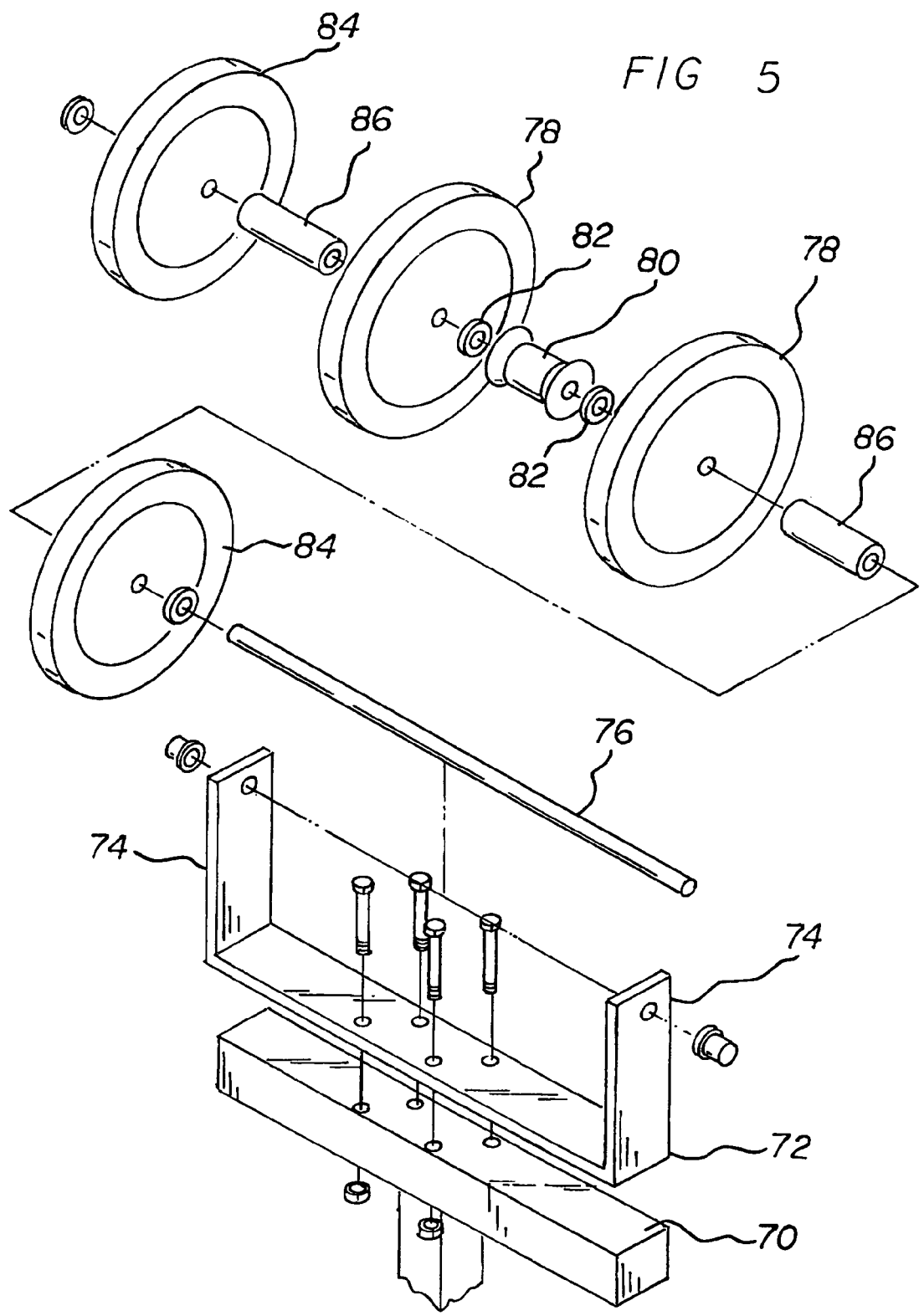
FIG. 5 is an exploded perspective illustration of the system shown in the prior Figures.

With reference now to the drawings, and in particular to FIG. 1 thereof, the preferred embodiment of the new and improved kayak handling system embodying the principles and concepts of the present invention and generally designated by the reference numeral 10 will be described. As used herein, the term "handling" is intended to encompass the loading and unloading of a kayak or other boat or object with respect to the roof of a vehicle.

The present invention, the kayak handling system 10 is comprised of a plurality of components. Such components in their broadest context include an L-shaped member and a roller assembly. Such components are individually configured and correlated with respect to each other so as to attain the desired objective.

First provided is a vehicle 14. The vehicle has a roof 16. Provided on the roof is a roof mounted supporting device 18. The vehicle also has a horizontally extending hitch 20. The hitch has a rearwardly facing recess 22. Apertures 24 are provided in the recess. As used herein, the term "vehicle" is intended to encompass any of a plurality of vehicles including a sedan, SUV, van and the like.

A kayak 28 is provided. The kayak has a keel 30. The keel is removably positionable upon the roof mounted supporting device.

Provided next is an L-shaped member 34. The L-shaped member has a forwardly extending horizontal leg 36. Apertures 38 are provided through the horizontal leg. The horizontal leg terminates in a recess 40. The L-shaped member also has an upwardly extending vertical leg 42. Apertures 44 are provided in the vertical leg. The vertical leg terminates in a recess 46.

A horizontal extension piece 50 is provided next. A plurality of apertures 52 are provided along the length of the horizontal extension piece. The horizontal extension piece has a front end. The front end is positioned within the rearwardly facing recess of the hitch. A forward pin 54 is provided. The forward pin removably extends through the apertures of the hitch. The forward pin extends through the apertures in the horizontal extension piece for coupling purposes. The horizontal extension piece has a rear end. The rear end is positioned within the recess of the horizontal leg. A rearward pin 56 is provided. The rearward pin removably extends through the apertures in the horizontal leg and the apertures in the horizontal extension piece for coupling purposes.

Further provided is a vertical extension piece 60. A plurality of apertures 62 is provided along the length of the vertical extension piece. The vertical extension piece has an upper end. The vertical extension piece has a lower end. The lower end is positioned within the recess of the vertical leg. An upper pin 64 is provided. The upper pin removably extends through apertures of the vertical leg and the apertures in the vertical extension piece for coupling purposes.

Provided last is a roller assembly 68. The roller assembly includes a cross piece 70. The cross piece has a central extent attached to the upper end of the vertical extension piece. The roller assembly includes a U-shaped support 72. The U-shaped support has a horizontal central portion. The horizontal central portion is bolted to the cross piece. The U-shaped support has upwardly extending end legs 74. The U-shaped support has a shaft 76. The shaft is rotatably supported by the end legs. The shaft has an axis. The axis of the shaft is in a horizontal plane closer to the roof of the vehicle than to the hitch. The roller assembly includes primary rollers 78 acting as feed rollers. The primary rollers are rotatably supported on the shaft. A central spool-shaped spacer 80 is provided. Washers 82 are provided. The central spool-shaped spacer and washers are provided between the primary rollers. The roller assembly includes secondary rollers 84 acting as stabilizers. The secondary rollers are rotatably supported on the shaft adjacent to the end legs. A cylindrical spacer 86 is provided. The cylindrical spacer is provided between each secondary spacer and an adjacent end leg. All of the rollers are preferably fabricated of a rigid material with an elastomeric surface to preclude scratching the kayak during loading and unloading. In this manner the keel of the kayak is adapted to be positioned upon the primary rollers and pushed into position upon the roof of the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A kayak handling system to assist a user in lifting a kayak onto a roof of a sedan and in removing the boat there from, the system comprising, in combination:
    a sedan having a roof with a roof mounted supporting device thereon, the sedan also having a horizontally extending hitch having a rearwardly facing recess with apertures;
    a kayak having a keel removably positionable upon the roof mounted supporting device;
    an L-shaped member having a forwardly extending horizontal leg with apertures there through, the horizontal leg terminating in a recess, the L-shaped member also having an upwardly extending vertical leg with apertures, the vertical leg terminating in a recess;
    a horizontal extension piece with a plurality of apertures along its length, the horizontal extension piece having a front end positioned within the rearwardly facing recess of the hitch, a forward pin removably extending through the apertures of the hitch and through the apertures in the horizontal extension piece for coupling purposes, the horizontal extension piece having a rear end positioned within the recess of the horizontal leg, a rearward pin removably extending through the apertures in the horizontal leg and the apertures in the horizontal extension piece for coupling purposes;
    a vertical extension piece with a plurality of apertures along its length, the vertical extension piece having an upper end, the vertical extension piece having a lower end positioned within the recess of the vertical leg, an upper pin removably extending through apertures of the vertical leg and the apertures in the vertical extension piece for coupling purposes; and
    a roller assembly including a cross piece having a central extent attached to the upper end of the vertical extension piece, a U-shaped support having a horizontal central portion bolted to the cross piece, the U-shaped support having upwardly extending end legs and a shaft rotatably supported by the end legs, the shaft having an axis in a horizontal plane closer to the roof of the sedan than to the hitch, primary rollers rotatably supported on the shaft with a central spool-shaped spacer and washers between the primary rollers, secondary rollers rotatably supported on the shaft adjacent to the end legs with a cylindrical spacer between each secondary spacer and an adjacent end leg, whereby the keel of the kayak is adapted to be positioned upon the primary rollers and pushed into position upon the roof of the sedan.

2. A kayak handling system to assist a user in lifting a kayak onto a roof of a vehicle and in removing the boat there from, the system comprising, in combination:
    a vehicle having a roof with a roof mounted supporting device thereon, the vehicle also having a horizontally extending hitch having a rearwardly facing recess with apertures;
    a kayak having a keel removably positionable upon the roof mounted supporting device;
    an L-shaped member having a forwardly extending horizontal leg with apertures there through, the horizontal leg terminating in a recess, the L-shaped member also having an upwardly extending vertical leg with apertures, the vertical leg terminating in a recess;
    a horizontal extension piece with a plurality of apertures along its length, the horizontal extension piece having a front end positioned within the rearwardly facing recess of the hitch, a forward pin removably extending through the apertures of the hitch and through the apertures in the horizontal extension piece for coupling purposes, the horizontal extension piece having a rear end positioned within the recess of the horizontal leg, a rearward pin removably extending through the apertures in the horizontal leg and the apertures in the horizontal extension piece for coupling purposes;
    a vertical extension piece with a plurality of apertures along its length, the vertical extension piece having an upper end, the vertical extension piece having a lower end positioned within the recess of the vertical leg, an upper pin removably extending through apertures of the vertical leg and the apertures in the vertical extension piece for coupling purposes; and
    a roller assembly including a cross piece having a central extent attached to the upper end of the vertical extension piece, a U-shaped support having a horizontal central portion bolted to the cross piece, the U-shaped support having upwardly extending end legs and a shaft rotatably supported by the end legs, the shaft having an axis in a horizontal plane closer to the roof of the vehicle than to the hitch, primary rollers rotatably supported on the shaft with a central spool-shaped spacer and washers between the primary rollers, secondary rollers rotatably supported on the shaft adjacent to the end legs with a cylindrical spacer between each secondary spacer and an adjacent end leg, whereby the keel of the kayak is adapted to be positioned upon the primary rollers and pushed into position upon the roof of the vehicle.

* * * * *